Dec. 7, 1937.    B. F. KURTZ    2,101,717
CAR BRAKE
Filed Aug. 25, 1936    3 Sheets-Sheet 1
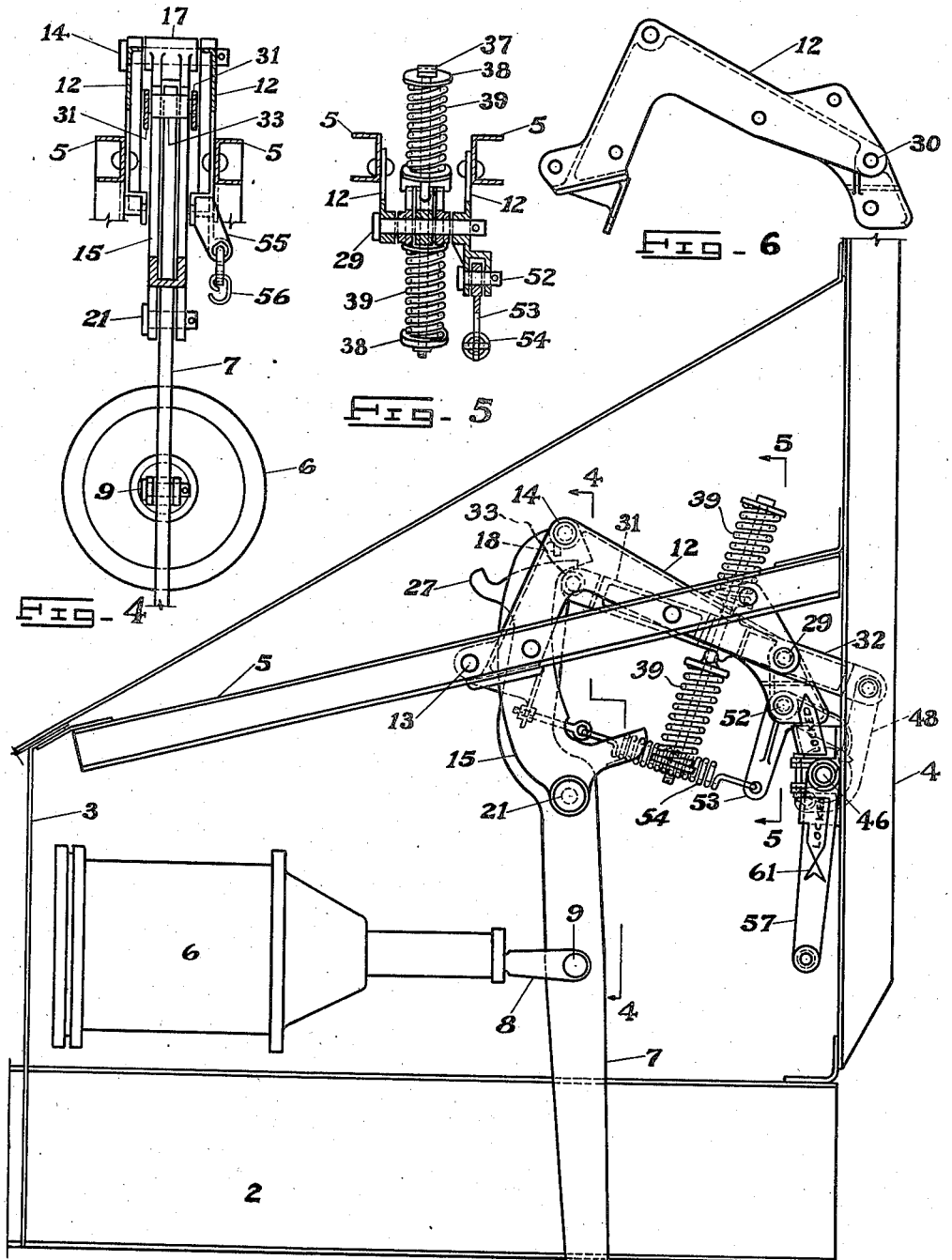
INVENTOR
Benjamin F. Kurtz
BY
E. Stitzler
ATTORNEY

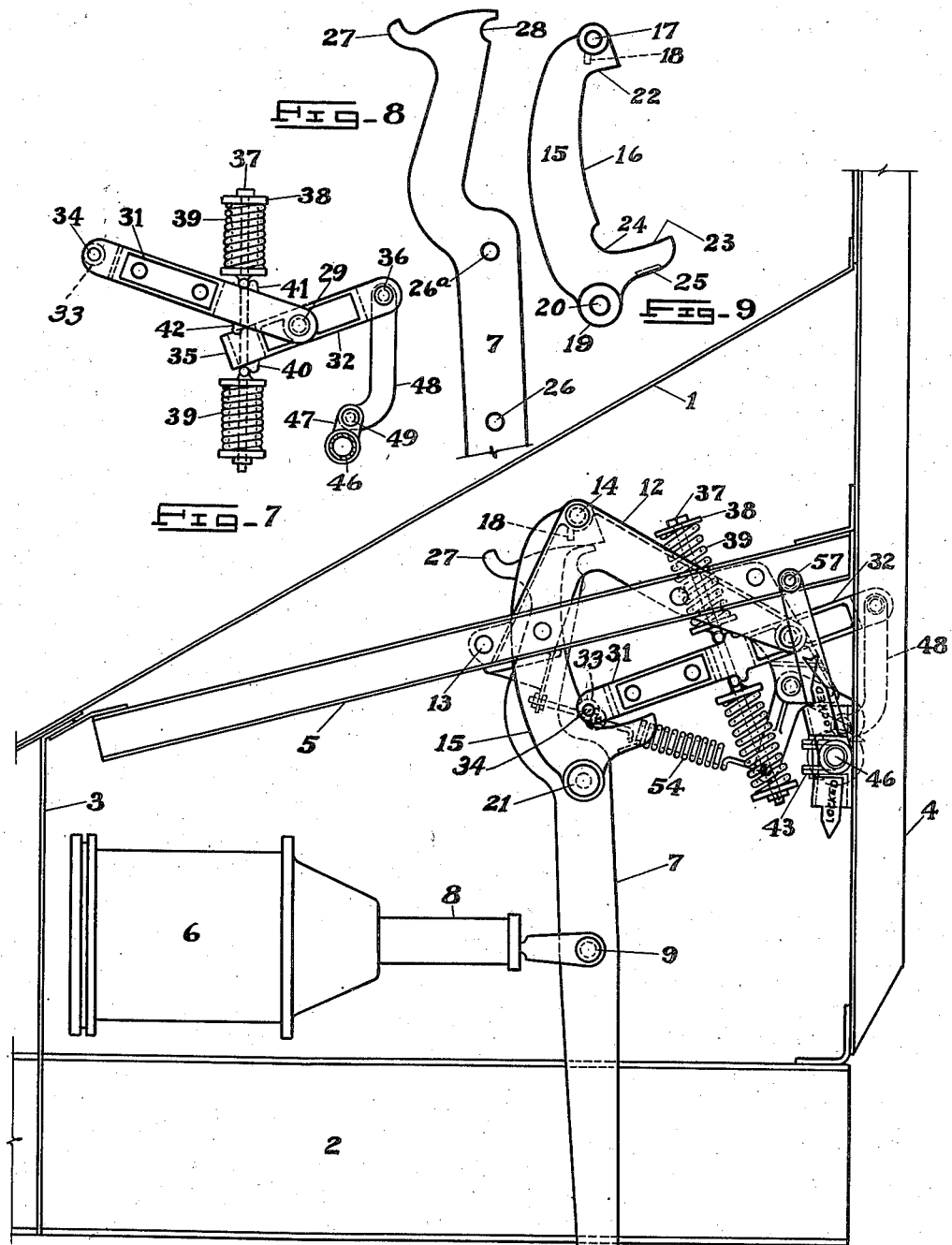

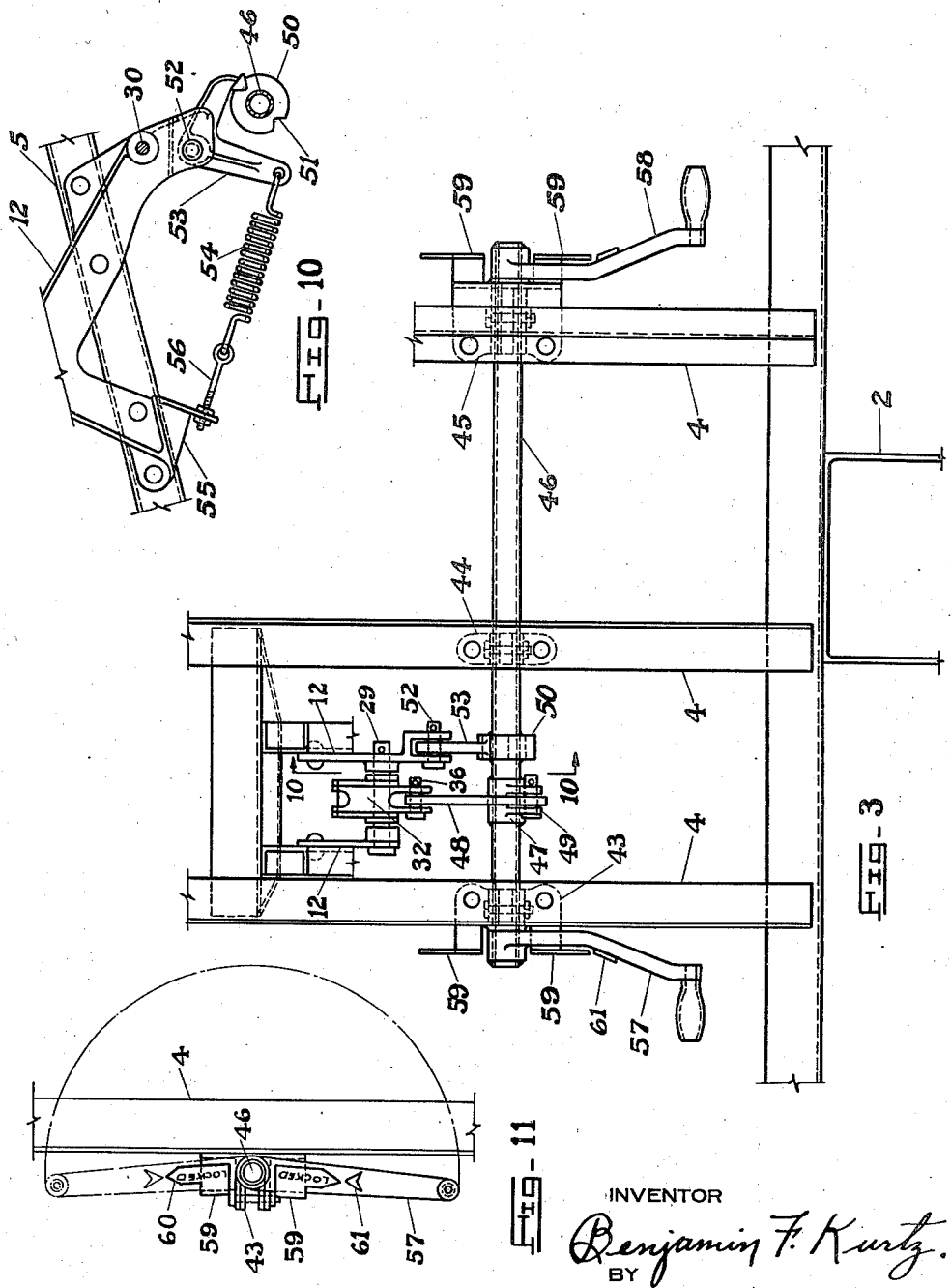

Patented Dec. 7, 1937

2,101,717

UNITED STATES PATENT OFFICE 2,101,717

CAR BRAKE

Benjamin F. Kurtz, Bellevue, Pa., assignor to Pressed Steel Car Company, Inc., Pittsburgh, Pa., a corporation of Pennsylvania Application August 25, 1936, Serial No. 97,808

17 Claims. (Cl. 188—195)

The invention pertains generally to brakes for railway vehicles and specifically to that type of brake generally designated as an empty and load brake. Whilst the generic idea of an empty and load brake is not new, recent developments in light weight cars and increases in the speed at which freight cars are moved have increased the general use of this type of brake mechanism. The brake mechanism forming the invention is the same or similar to that now in use on railroad cars with the addition of a device for varying the braking effort applied to the wheels of the vehicle according to whether the vehicle is loaded or empty. Some forms of empty and load brake produce the variation in braking effort by means of a variation in the fluid pressure within the air brake cylinders. Others have obtained the variation in braking effort through mechanical means effecting changes in the location of the fulcrum of the live brake lever. My device is of the latter type.

One common fault of empty and load brake mechanisms using a mechanical fulcrum change-over device was the inability to manipulate the change-over device whilst the brakes were applied. It frequently occurs that a string of loaded cars will be set out upon a siding for unloading. The brake mechanism on such cars had been set for a load application of the brakes during transport of the cars and when the cars are placed on the siding the brakes are applied. After the cars are unloaded they will again be returned to general service and whilst being thereafter handled empty it is desirable to have an empty application of the brakes. With the ordinary type of empty and load brake, the manipulation of the fulcrum change-over device must occur when the brakes are in released position and for all practical purposes this necessitates a manipulation of the change-over device after the cars are unloaded, because of this condition the cars are very frequently returned to general service with the brakes set for a load application of the car although the car is empty. Those familiar with railway vehicle air brakes are aware that when a train of cars is set out on a siding and the brake line is severed from the engine, the brakes are automatically applied and once the brakes are released it is necessary to recharge the reservoirs of the individual cars before another application of the brakes can be made. Therefore, if after the cars are once set on the siding, and before unloading, the brakes are released to manipulate the change-over device, there is no means for re-applying the brakes and the loaded cars would have to be held by the hand brakes.

An object of the present invention is to provide an empty and load brake having a mechanical fulcrum change-over device with means whereby the change-over device may be manipulated whilst the brakes are in applied position.

Another object of the invention is to provide an empty and load brake of the character described with means for indicating the position of the change-over device.

Another object of the invention is to provide a locking mechanism for such indicating means so as to prevent accidental or undesired manipulation of the mechanical fulcrum change-over device.

A further object of the invention is to provide an empty and load brake of the character described with a mechanical fulcrum change-over device which may be operated whilst the brakes are in applied position, which will not disturb the existing application of the brakes and which does not vary the braking effort until the brakes are released and subsequently applied.

Referring to the drawings forming part of this specification, Fig. 1 shows a portion of a railway car equipped with the invention and having the brakes applied and the change-over device set for a load application of the brakes; Fig. 2 shows a portion of the car equipped with the invention having the brakes applied and the fulcrum change-over device set for an empty application of the brakes; Fig. 3 shows in end elevation the portion of the car and change-over device of Fig. 1; Fig. 4 is a section taken on lines 4—4 of Fig. 1; Fig. 5 is a section taken on the lines 5—5 of Fig. 1; Fig. 6 is an enlarged detail of a portion of the change-over device; Fig. 7 shows in enlarged detail the action of the change-over device when manipulated whilst the brakes are applied; Figs. 8 and 9 are enlarged views of portions of the change-over device; Fig. 10 is a section taken on the lines 10—10 of Fig. 3; Fig. 11 is an enlarged detail of the indicating mechanism.

Referring now in detail to the drawings where like reference characters indicate like parts, reference character 1 indicates a portion of a railway hopper car having the usual center sills 2, bolster 3, end posts 4 and brace 5 extending from the end posts 4 to the bolster 3 and serving to support the change-over mechanism. As previously stated, my invention contemplates using the usual braking system for railway cars including the brake cylinder 6, live brake lever 7 pivotally connected to the piston 8 of the brake cylinder by means of the pin 9, and having one end of the lever 7 pivotally connected by means of the pin 10 to the brake rod 11 extending to the remaining portions of the usual braking system (not shown on the drawings).

The fulcrum change-over device which is the subject matter of my invention comprises a pair of oppositely disposed bearing plates 12 secured to the adjacent braces 5 of the car structure by means of fastening members 13 which are preferably rivets but may be bolts or any other fastening means. These bearing plates 12 preferably extend above and below the members 5. Disposed between the plates 12 and journaled on a pin 14 connecting the upper ends of the plates 12 is a brake lever hanger 15. The brake lever hanger 15 comprises spaced arms 16 having their upper end portions connected by the bearing 17 having an opening therein to receive the pin 14. Depending from the bearing 17 and between the arms 16 is a lug 18. The lower ends of the arms 16 terminate in bearings 19 having openings 20 therein for receiving the pin 21 connecting the hanger 15 to the brake lever 7 disposed between the arms 16. The arms 16 intermediate the bearings 17 and 19 are made arcuate for a purpose to be hereinafter described. The upper ends of the arms 16 and adjacent the bearing 17 have a portion 22 angularly disposed to the arcuate surfaces of the arms to provide a bearing surface. The lower ends of the arms 16 have an angularly disposed portion 23 forming an offset 24 with the arcuate surfaces of the arms 16 for a purpose to be hereinafter described. The angular portions 23 of the arm 16 are preferably connected adjacent their lower edges by the web 25.

The brake lever 7 has an opening 26 intermediate the ends of the lever for receiving the pin 9 and an opening 26a adjacent one end thereof for receiving the pin 21 connecting the lever to the brake hanger 15. One end of the brake lever 7 outwardly of the opening 26a is preferably offset from the major portion of the brake lever and terminates in a lug 27 at one side of the lever. On the opposite side of the lever and inwardly from the end thereof is a concave bearing surface 28.

Pivotally mounted on the pin 29 journaled in the openings 30 of the bearing plates 12 is a brake lever fulcrum member comprising an arm 31 having one end mounted on the pin 29 and an arm 32 pivotally mounted intermediate its ends upon the pin 29. The free end of the arm 31 is bifurcated and has a roller 33 disposed between the bifurcations and mounted on a pin 34 journaled in the arm 31. The end of the arm 31 opposite the roller 33 is bifurcated to receive one end of the arm 32 which is normally disposed between the bifurcated arms of the member 31 and connected thereto and to the bearing plates 12 by means of the pin 29. The portion of the arm 32 disposed within said bifurcation has an opening 35 therein and the opposite end of the arm 32 is bifurcated with apertures in the arms thereof to receive the pin 36. The arms 31 and 32 are normally in alignment and maintained so by means of the rod 37 passing through the opening 35 of the arm 32 and having bearing plates 38 mounted on the rod with compression springs 39 disposed on opposite sides of the arm 31 and between the bearing plates 38. Lugs 40 on the arm 32 and lugs 41 and 42 on the arm 31 engage the rod 37 to center the same within the opening 35 of the arm 32.

Pivotally mounted on the end posts 4 of the car by means of the bearings 43, 44 and 45 is an operating shaft 46. Rigidly mounted on the shaft 46 is an arm 47 which is connected to the arm 32 of the fulcrum member by means of the link 48. One end of the link 48 being connected to the arm 47 by means of the pin 49 and the other end of the link being disposed between the bifurcated portion of the arm 32 and connected thereto by means of the pin 36.

A locking device for maintaining the fulcrum member in selected position comprises the shaft 46 with the member 50 rigidly mounted thereon and provided with suitably spaced indentations 51 in the periphery of the member. Pivotally mounted in the bearing plates 12 by means of the pin 52 is a bell crank 53 having the free end of one of its arms suitably formed to engage the indentations 51 of the member 50 and an aperture in the free end of the other arm to receive an end of a tension spring 54 which extends between the bell crank 53 and the bracket 55 of the bearing plate 12 and connected thereto by means of the rod 56.

For the purpose of manipulating the fulcrum member of the change-over device, an operating mechanism is provided comprising handles 57 and 58 rigidly mounted on opposite ends of the shaft 46. These handles move between bearing plates 59 disposed on diametrically opposite sides of each end of the shaft 46 and associated with the bearings 43 and 45 supporting the shaft 46. These bearing plates 59 terminate in angularly disposed flanges 60 beneath which the handles move. On the outer faces of the flanges 60 are placed the word "Locked" and the oppositely disposed edges of the flanges 60 terminate in pointed portions in alignment with the word "Locked". Mounted on the handles 57 and 58 are raised arrow-shaped portions 61 which register with the correspondingly shaped portions of the flanges 60 of the bearing plates 59 as the handles are rotated to engage beneath the flanges 60 of the bearing plates.

Referring now to Fig. 1 of the drawings disclosing the fulcrum change-over device set for a load application of the brakes and the brakes in applied position, it will be observed that the indentation 28 at the upper end of the brake lever 7 is in engagement with the roller 33 of the fulcrum member thereby causing the lever 7 to pivot about the roller 33 as the lever is moved toward the ends of the car by the piston 8 of the brake cylinder 6. During this movement of the brake lever 7, it is suspended from the car by means of the brake hanger 15 pivotally connected to the lever and pivoted on the pin 14 mounted in the plates 12. When the fluid pressure in the brake cylinder is released, the piston 8 moves inwardly under the action of the brake rod 11 causing the lever 7 to pivot about the roller 33 and carry the brake hanger 15 rearwardly upon the pin 14. During this latter movement the brake hanger 15 pivots relative to the brake lever 7 upon the pin 21. The brakes now being in released position there is no appreciable force acting on the roller 33 and the fulcrum member formed of the arms 31 and 32 may move downwardly on the pin 29. It is for this purpose the arms 16 of the hanger 15 have been made arcuate to correspond to the path of movement of the roller 33.

With the brakes of Fig. 1 in the above described released position and it is desired to manipulate the fulcrum change-over device to secure an empty application of the brakes, the fulcrum change-over arm may be moved into the position shown in Fig. 2 of the drawings for this purpose. To do this the operator grasps the handle of arm 57 of Fig. 1 and rotates the arm in a counter clockwise direction into the position shown by Fig. 2 of the drawings. This movement of the operating arm has caused the shaft 46 to rotate in a counter clockwise direction causing the crank 47 to move upwardly, which motion is transferred to the link 48 connected to the crank 47 by the pin 49 and to the fulcrum change-over arm by the pin 36 causing the roller and arms 31 and 32 to rotate about the pin 29. It will be obvious then that when the brakes are applied as is shown in Fig. 2 of the drawings the piston 8 of the brake cylinder 6 has moved the lever 7 and brake hanger 15 outwardly so that the roller 33 of the fulcrum change-over arm has engaged the surface 24 of the hanger 15 and as the adjacent end of the lever 7 has been offset so as to be free of the roller 33, the lever 7 pivots about the pin 21 to give an empty application of the brakes. It is likewise obvious that when the fluid pressure within the cylinder 6 is released and the piston 8 moves inwardly it carries the brake lever 7 inwardly and with it the hanger 15 which moves away from the roller 33. During this movement of the brake lever on release of the brakes it pivots on the pin 21 and to insure movement of the hanger 15 away from the roller 34 the lug 27 has been provided on the upper end of the brake lever so that upon movement inwardly it engages the lug 18 on the bearing 17 of the brake hanger, preventing further movement of the upper end of the brake lever 7 and causes the hanger 15 to rotate in a clockwise direction away from the roller 33. Obviously now, if the operator desires to set the brakes for a load application of the brakes, he grasps the handle of the arm 57 of Fig. 2 of the drawings, rotates it in a clockwise direction to bring the change-over device into the position shown in Fig. 1 of the drawings.

Assuming, however, the brakes are in applied position as shown in Fig. 1 of the drawings and it is desired to set the fulcrum change-over device so that the next application of the brakes will be an empty application and it is desired to make this setting before the brakes are released, the operation is as follows: the operator grasps the handle of the operating arm 57 of Fig. 1 of the drawings and rotates the arm in a counter clockwise direction into the position shown by Fig. 2 of the drawings. During this movement, however, the roller 33 in the arm 31 of the fulcrum member has been engaged by the portion 28 of the brake lever 7 and the arm 31 is in compression between the brake lever 7 and the pin 29 by reason of the lever 7 fulcruming about the roller 33. Therefore, the arm 31 remains in the position shown in Fig. 1 of the drawings whilst the arm 32 pivots about the pin 29 into the position shown in Fig. 2 of the drawings. This movement of the arm 32 relative to the arm 31 has caused the free end of the arm 32, moving within the bifurcated portion of the arm 31, to move downward carrying with it the lower spring 39 of the rod 37 as shown in Fig. 7 of the drawings. This movement of the arm 32 has been equalized between the two springs 39 on the rod 37, compressing the springs so that when the brakes are released and the pressure by the lever 7 on the roller 33 is also released, the springs 39 expand and carry the arm 31 from the position shown in Fig. 7 of the drawings into that shown in Fig. 2 of the drawings so that a subsequent application of the brakes causes the lever 7 to pivot about the pin 21 in the hanger 15 to secure an empty application of the brakes.

For the purpose of maintaining the operating arms 57 and 58 in their respective positions, a locking device has been provided as shown in Fig. 10 of the drawings. It will be observed upon reference to Figs. 1 and 10 of the drawings that the arm 57 has an arrow shaped portion 61 corresponding to a pointed extension 60 of the bearing plate 59 to indicate the operating arm is in locked position. For purposes of maintaining the arm in this position as shown by Fig. 10 of the drawings, a disc 50 has been mounted on the shaft 46 and provided with indentations 51 on the periphery of the disc. The bell crank 53 pivotally mounted on the plates 12 by means of the pin 52 has one arm suitably shaped to engage the indentations of the disc 50 and the other arm connected with a tension spring 54 mounted in the bearing plate 12 to maintain the bell crank 53 in engagement with the indentation on the periphery of the disc 50. It will be obvious that under normal conditions the bell crank 53 will remain in engagement with the disc 50 preventing rotation of the shaft 46 and consequential change of the position of the change-over arm as previously described. When, however, it is desired to change the position of the fulcrum member and the operator rotates the operating arm 57, the rotation of the shaft 46 and disc 50 causes a rotation of the bell crank 53 releasing it from the disc 50 and permitting movement of the fulcrum member. As shown in Fig. 3 of the drawings, the operating shaft preferably extends transversely of the car having operating handles 57 and 58 on opposite ends thereof and with duplicate indicating mechanisms adjacent each end of the shaft and operating arms.

The above is a detailed description of a specific embodiment of one form of my invention which invention in its generic form comprises the combination of a brake lever pivotally connected to the car by means of a variable fulcrum device including a member pivotally connected to the car and to the lever and a fulcrum member movable relative to the lever and its connected member for the purpose of varying the fulcrum support of the brake lever upon the car. The fulcrum member includes a means whereby the change-over device can be manually set whilst the brakes are in applied position so as to maintain the existing fulcrum support for the lever and to automatically move to change the fulcrum support for the lever when the brakes are released. It will be obvious to those skilled in the art that many changes may be made in the various details of my invention and I do not wish to be limited to the specific embodiment of the invention except as is made necessary by the scope of the appended claims.

Having thus described the invention what I claim as new and desire to secure by Letters Patent is:

1. In an empty and load brake rigging of the character described, in combination, a brake lever, a brake lever hanger, a pivotal connection between the brake lever and brake hanger, a support for the brake hanger, a fulcrum member for selective engagement with the lever and hanger to vary the effective length of the brake lever and resilient means for retaining the fulcrum member in selected position.

2. In an empty and load brake rigging of the character described in combination, a brake lever, a brake lever hanger, means connecting the lever and hanger for relative movement, a support for said hanger, a fulcrum member for selective engagement with the lever and hanger for varying the fulcrum point of the lever and means associated with said fulcrum member whereby the fulcrum member during the time the brake is in applied position may be manually set to maintain the existing fulcrum point of the brake lever and upon release of the brake automatically move the fulcrum member to provide a different fulcrum point for the lever for the next subsequent application of the brakes.

3. In a railway car having a brake mechanism including a fluid pressure brake actuating means, and a lever connecting said means with the remainder of said brake mechanism, the combination therewith of a device associated with one end of said lever to vary the force transmitted from said fluid pressure means to said mechanism through said lever, and comprising a brake lever hanger pivotally mounted on the car, a pivotal connection between the hanger and lever, a jointed fulcrum member for selective engagement with said lever and hanger to change the fulcrum support of the lever, means for actuating said fulcrum member, and resilient means associated with the joint of the fulcrum member to normally maintain the fulcrum member portions in alignment.

4. In a railway car, the combination with the usual brake system including a fluid pressure actuated brake cylinder and associated brake lever, of a hanger member pivotally connecting the brake lever with the car structure, a fulcrum member selectively engaging the hanger member and brake lever, and means associated with said fulcrum member for alternately moving the fulcrum member into engagement with the said hanger and said lever and for manually setting said fulcrum member when said brakes are applied for automatic movement upon release of the brakes.

5. In an empty and load brake rigging for railway cars, in combination, a brake cylinder, a brake lever, a brake rod, connections between the brake lever and the cylinder and rod, a hanger supporting one end of the lever, a jointed abutment member selectively engaging the hanger member and adjacent end of the lever and resilient means normally retaining the jointed portions of the abutment member in extended position.

6. In an empty and load brake rigging, in combination, a brake cylinder, a brake lever, a brake rod, connections between the lever and the said cylinder and rod, and means associated with one end of the lever providing a plurality of fulcrum supports for the lever, said means including a jointed member normally held in extended position by resilient means.

7. In an empty and load brake rigging in combination, a brake lever, an actuating member connected therewith, and means associated with one end of the lever for providing a plurality of fulcrum supports therefor, said means including a selectively movable jointed member normally held in extended position by resilient means.

8. In an empty and load brake rigging, in combination, a brake lever, an actuating member connected therewith, a pivotal support for one end of the lever and a fulcrum member selectively engaging said lever and associated support to provide a fulcrum for said lever, said fulcrum member including means for manually setting the fulcrum member when the brake is in applied position for an automatic shifting of the fulcrum for the lever when the brake is subsequently released.

9. In an empty and load brake rigging, in combination, a brake lever, an actuating member connected therewith, a variable fulcrum support for one end of said lever comprising a member pivotally connected to the lever, a fulcrum member selectively engaging said first member at a plurality of points along the length thereof, and an operating device associated with fulcrum member for retaining the same in selected position, said device including means for manually setting the fulcrum member during the time the brake is applied so as to automatically shift to a selected position upon release of the brake.

10. In an empty and load brake rigging of the character described, in combination, a brake lever, an actuating member connected therewith, a variable fulcrum support for one end of said lever including a movable jointed member maintained in normal extended position by resilient means, and an actuating device for said jointed member.

11. In an empty and load brake rigging for a railway car, in combination, a brake lever having an actuating means connected therewith, a connection between said lever and the remainder of the said brake, and a variable fulcrum for said lever upon said car including a jointed compression member having means associated therewith for moving the fulcrum member as a unit relative to the brake lever when the brake is in released position and for moving portions of said fulcrum member relative to the lever without disturbing the remainder of the fulcrum member when the brake is in applied position.

12. In an empty and load brake rigging for a railway car, in combination, a brake lever, a variable fulcrum support for said lever upon the car including a movable fulcrum member, and an operating mechanism for said fulcrum member including resilient means normally resisting movement of the operating mechanism.

13. In an empty and load brake rigging on a railway car, in combination, a brake lever, a variable fulcrum support for said lever upon the car including a selectively movable fulcrum member, an operating mechanism for said fulcrum member including a rotatable shaft having a crank rotatable therewith and resilient means automatically restricting rotation of said crank after bringing the fulcrum member into selected position.

14. The combination in a railway car of a brake mechanism including a lever, a variable fulcrum support for the lever upon the car including a movable fulcrum member, a crank rotatably mounted on the car for actuating said fulcrum member, a latching member associated with said crank and resilient means on said latch normally maintaining the latch in position to prevent rotation of said crank during operation of the brake and releasable upon forcible rotation of the crank.

15. In an empty and load brake rigging for a railway car, in combination, a brake lever, a variable fulcrum support for said lever including a fulcrum member of jointed link construction, having the adjacent ends of the links overlapping at one side of the joint and resilient means disposed on opposite sides of the overlapping portions of the links to normally retain the links in alignment.

16. In an empty and load brake rigging, in combination, a brake lever, a variable fulcrum support for said lever including a fulcrum member comprising a link having a bifurcated end portion, a link extending within the bifurcation of said first named link, a pivotal connection between the links and resilient means normally retaining the links in alignment.

17. In an empty and load brake rigging for a railway car, in combination, a brake lever having an end portion offset relative to the major portion of the lever, a variable fulcrum support for the lever associated with said offset portion and including a member pivotally connected to the lever, a fulcrum member selectively movable relative to the lever and first named member, and means associated with said fulcrum member for manually setting the fulcrum member for automatic movement relative to said lever and pivotally connected member upon movement of the lever relative to said fulcrum member.

BENJAMIN F. KURTZ.